(12) United States Patent
Ando et al.

(10) Patent No.: US 6,356,330 B1
(45) Date of Patent: Mar. 12, 2002

(54) ACTIVE MATRIX LIQUID CRYSTAL DISPLAY DEVICE

(75) Inventors: Masahiko Ando, Hitachinaka; Tsunenori Yamamoto; Masatoshi Wakagi, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/427,626

(22) Filed: Oct. 27, 1999

(30) Foreign Application Priority Data

Oct. 27, 1998 (JP) .......................................... 10-305013

(51) Int. Cl.[7] ..................... G02F 1/1343; G02F 1/1333; G02F 1/1339
(52) U.S. Cl. ...................... 349/141; 379/111; 379/156
(58) Field of Search ................................ 349/141, 111, 349/110, 191, 156

(56) References Cited

U.S. PATENT DOCUMENTS 6,069,678 A * 5/2000 Sakamoto et al. .......... 349/141

FOREIGN PATENT DOCUMENTS

JP 8-62578 3/1996

* cited by examiner

*Primary Examiner*—Toan Ton
(74) *Attorney, Agent, or Firm*—Antonelli, Terry, Stout & Kraus, LLP

(57) ABSTRACT

An active matrix liquid crystal display device is provided for realizing a high uniformity of display luminance with lower power consumption, a higher contrast, and a wider viewing angle. In a common wire eliminated (common-less) IPS-type active matrix liquid crystal display device, an opposing electrode 107 is arranged above a signal wire 104 and a thin film transistor (TFT) through an insulating layer. The opposing electrode 107 and a scanning wire 101 shield the signal wire 104 or the TFT to prevent light from leaking from edge portions of the signal wire 104 as well as the TFT from malfunctioning due to a current generated by leaked light, thereby realizing the elimination of a black matrix (BM), a reduction in size of a black matrix, and planarized substrates, thus resulting in a higher aperture ratio and an improved uniformity of cell gap.

13 Claims, 8 Drawing Sheets

ACTIVE MATRIX LIQUID CRYSTAL DISPLAY DEVICE

FIELD OF THE INVENTION

The present invention relates to an active matrix liquid crystal display device. More particularly, the present invention relates to an active matrix liquid crystal display device which is configured in accordance with the IPS (In-Plane Switching) type (also called the lateral electric field type).

BACKGROUND OF THE INVENTION

In recent years, active matrix liquid crystal display devices employing active elements, represented by thin film transistors (TFTs), have been increasingly used as monitors for personal computers, workstations, and so on since they consume less power and have smaller sizes than CRT display devices while providing a high image quality equivalent to that of the CRT display devices.

One form of a liquid crystal display device suitable for monitor applications is an IPS-type active matrix liquid crystal display device. The liquid crystal display device of this type includes scanning wires, signal wires, common wires, and pairs of interdigitally formed electrodes (pixel electrode and opposing electrode) arranged on one of the two substrates, where a voltage is applied across the electrodes to drive liquid crystal. An electric field applied to the liquid crystal is substantially parallel to the surfaces of the substrates. The liquid crystal display device of IPS-type has a wider viewing angle than conventional liquid crystal display devices. This characteristic of the IPS-type liquid crystal display device makes itself more suitable for applications in direct-view type monitors.

FIG. 4 illustrates in plan view the structure of one pixel section in a conventional IPS-type active matrix liquid crystal display device as mentioned. FIG. 5 illustrates the structure of FIG. 4 in cross-sectional view taken along a line B–B' in FIG. 4.

Referring first to FIG. 4, the pixel section includes scanning wires 101 formed of Cr; a semiconductor layer 102 formed of amorphus silicon; a signal wire 103 formed of Cr; a pixel electrode 106 formed of Cr; opposing electrodes 107 and 107' formed of Cr; a common wire 401 formed of Cr; and a black matrix 402.

The liquid crystal display device having the structure as illustrated includes a gap between the opposing electrode 107 and the signal wire 103. An effective electric field to the pixel for display cannot be applied through this gap. In addition, this gap must be shielded because light is likely to leak from the gap due to a continuously changing voltage on the signal wire 103.

Moreover, a gap between the scanning wire 101 and the common wire 401 must be shielded since light is likely to leak from the gap due to a direct current voltage applied at all times to these wires. Furthermore, gaps between the scanning wire 101 and ends of the opposing electrodes 107, 107' must be shielded for the same reason. In addition, a thin film transistor (TFT) must be shielded over for preventing the TFT from malfunctioning due to a current possibly caused by leaked light. Thus, the liquid crystal display device has a low aperture ratio because the pixel section must be shielded by the black matrix 402. Further, the existence of the common electrode 401 also contributes to the low aperture ratio of the liquid crystal display device.

As illustrated in FIG. 5, a section in which a TFT 216 is arranged presents an abruptly narrowing gap between a TFT substrate 214 and an opposing substrate 215. This is because:

1) a thicker passivation layer 205 for the purpose of planarizing the TFT substrate 214 cannot be employed because of a resulting increase in a liquid crystal driving voltage; and
2) the black matrix 204 provided on the opposing substrate 215 in face of the TFT section cannot be omitted since the black matrix 204 is indispensable for preventing the TFT from malfunctioning due to a current generated by leaked light.

In the exemplary liquid crystal display device, a spacer bead (hereinafter simply called the "bead") 211 positioned on the TFT section serves to define a cell gap. However, since the area of the TFT section is merely on the order of $\frac{1}{100}$ as much as an entire pixel, the beads 211 arranged on the TFT sections account for only $\frac{1}{100}$ or less of the entire area of the substrates. For this reason, in substrate regions without the TFT sections and accordingly not supported by the spacer beads 211 arranged therebetween, the cell gap suffers from non-uniformity which in turn causes a non-uniform display luminance.

Nevertheless, if an increased amount of beads 211 is dispersed in an attempt to make the cell gap more uniform, the number of beads increases not only on the TFT sections but also at openings. Thus, while the cell gap can be made more uniform, more light leaks near beads positioned at openings, resulting in a lower contract.

In the cross-sectional view of FIG. 5, the structure further comprises a glass substrate 201; a gate insulating layer 202; a contact layer 204; an alignment film 206; a glass substrate 207; a color filter layer 208; a protection film 209 which also serves as a planarizing film; an alignment film 210; a liquid crystal layer 212; and polarizing plates 213, 217.

SUMMARY OF THE INVENTION

When compared with a conventional TN-type liquid crystal display device, the IPS-type liquid crystal display device has the following two problems to be solved.

First, higher power consumption is required. This is because a low aperture ratio of the IPS-type liquid crystal display device requires higher power consumption to drive back light for providing the luminance equivalent to that of the conventional TN-type liquid crystal display device.

The low aperture ratio of the IPS-type liquid crystal display device is mainly caused by the following facts:

1) interdigital electrodes do not transmit light; and
2) a black matrix (hereinafter abbreviated as "BM") arranged on an opposing substrate partially blocks openings from receiving light.

Regions blocked by the BM are edge portions of scanning wires and signal wires, and TFT sections.

The edge portions of scanning wires and signal wires are shielded because light may leak from these portions. The TFT sections are shielded for preventing TFTs from malfunctioning due to a current generated by leaked light.

The BM has an area which is typically set larger than the sum of possible light leaking regions and TFT regions for taking into account an allowance of the alignment of a substrate which has formed thereon the possible light leaking regions and the TFT regions to be shielded (hereinafter called the "TFT substrate"), to another substrate on which the BM is formed (hereinafter called the "opposing substrate").

This wide area of the BM contributes to an additional reduction in the aperture ratio. The aperture ratio must be increased in order to reduce power consumption.

Another problem is that the IPS-type liquid crystal display device suffers from a low uniformity of display luminance.

This is because in the IPS-type liquid crystal display device, a threshold voltage for the luminance characteristic is inversely proportional to the thickness of a liquid crystal layer sandwiched between the pair of substrates (cell gap), so that non-uniformity of the cell gap, if any, would appear in a display as corresponding non-uniformity of luminance.

In the TN-type liquid crystal display device, on the other hand, a threshold voltage does not depend on a cell gap, so that the uniformity of display luminance is relatively high. In order to improve the uniformity of display luminance in the IPS-type liquid crystal display device, the uniformity of the cell gap between the two substrates must be ensured more strictly than the TN-type liquid crystal display device. However, an attempt to make the cell gap more uniform using currently available methods would result in a lower contrast which constitutes a further problem. In the following, the cause of the second problem will be explained in detail.

The non-uniform cell gap and the reduced contrast caused by an attempt to make the cell gap more uniform attribute to the ruggedness of the opposing surfaces of the two substrates and the beads used to form the cell gap.

When the cell gap is formed by sandwiching beads between such rugged surfaces of two substrates, the cell gap is defined by those beads that are sandwiched between regions in which the spacing between the substrates is the narrowest. In the active matrix liquid crystal display device, it is the TFT section that has the narrowest spacing between the substrates. This is because the TFT section has such a structure that the most protruding TFT section on one substrate faces the most protruding section on the other substrate in which a black matrix for shielding the TFT overlaps a color filter, so that the spacing between the substrates is the narrowest in this region.

The TFT section has an area approximately $1/100$ a pixel area. Thus, when beads are dispersed over the TFT substrate, beads would be sandwiched between the TFT sections of the TFT substrate and corresponding sections of the opposing substrate with a possibility of $1/100$ or lower, in additional consideration of the fact that the beads are carried on the TFT sections with more difficulties than on other flat regions. For example, when 100 beads are dispersed, 99 beads will be positioned on pixel sections other than the TFT sections, and thus will not contribute to supporting the substrates. Regions in which the substrates are not supported by beads are more likely to suffer from a non-uniform cell gap which would give rise to the non-uniformity of display luminance in the IPS-type liquid crystal display device.

To improve the uniformity of display luminance, the cell gap must be made more uniform. When a larger amount of beads is dispersed to improve the uniformity of the cell gap, an increased number of beads may be positioned in the TFT sections, whereas the number of beads positioned in openings is also increased in proportion.

Generally, near beads, light is more likely to leak due to defective alignment of liquid crystal. For this reason, while the increase in the number of beads might provide a more uniform cell gap, the contrast would be degraded due to light leaking near the beads positioned in openings. Thus, when the cell gap is made more uniform by dispersing an increased amount of beads, the contrast is degraded. To reduce the amount of dispersed beads required for a higher uniformity of the cell gap, the ruggedness on the opposing surfaces of a pair of substrates must be reduced to planarize the surfaces.

In summary, the IPS-type active matrix liquid crystal display device has the following problems:

1) high power consumption; and
2) low uniformity of display luminance.

To overcome these problems, 1) the aperture ratio must be increased to reduce power consumption for driving the back light; and
2) the cell gap must be made more uniform while avoiding a degraded contrast.

It is an object of the present invention to provide an IPS-type active matrix liquid crystal display device which exhibits a high contrast in a displayed image.

It is another object of the present invention to provide an IPS-type active matrix liquid crystal display device which is capable of eliminating a light shielding film required in conventional IPS-type active matrix liquid crystal display devices.

As a first structure to solve the above problems, in an IPS-type active matrix liquid crystal display device, a portion of an opposing electrode for driving a liquid crystal for display together with a pixel electrode is formed over a signal wire through an insulating film. Then, a region having the signal wire formed therein, viewed from a direction perpendicular to the surface of a substrate, is included entirely within a region having the opposing electrode formed therein and a region having a scanning wire formed therein, without protruding therefrom. Alternatively, the portion of the opposing electrode may be formed over an active element through an insulating film.

A first feature of this structure lies in a common wire eliminated configuration (common-less configuration), as described in JP-A-8-62578, in which the scanning wire functions also as a common wire while omitting the common wire which is included in conventional IPS-type active matrix liquid crystal display devices. By employing the structure based on the common wire eliminated configuration, it is possible to eliminate a BM arranged on the opposing substrate in conventional liquid crystal display devices. This results in improving the aperture ratio as well as the planarity of the opposing substrates of the liquid crystal display device.

The followings are the reasons why the present invention can eliminate BM which is required in conventional liquid crystal display devices for shielding the active element and possible light leaking regions in edge portions of the scanning wire and the signal wire:

1) the opposing electrode arranged over the active element functions as a light shielding layer;
2) since the signal wire is completely covered with the opposing electrode and the scan electrode, light leaking from edge portions of the signal wire is eliminated; and
3) Since the common wire eliminated configuration is inherently free of light leaking from edge portions of the scanning wires, light shielding is not required.

Within the above reasons, since the signal wire is completely covered with the opposing electrode and the scanning wire as set forth in 2), the structure of the present invention is realized by forming the opposing electrode such that its end portion is placed over the corresponding scanning wire.

The light leaking from edge portions of the signal wire can be completely eliminated by employing the structure as described above because the present invention employs the common wire eliminated configuration.

As described in JP-A-8-62578, in the common wire eliminated configuration, equal voltages are applied across opposing electrodes and corresponding scanning wires during most of a liquid crystal display operating period, so that light will not leak even if an end portion of the opposing electrode is placed over the scanning wire.

On the other hand, in a conventional structure having a common wire, a direct current is applied between an opposing electrode and a corresponding scanning wire during most of a liquid crystal display operating period, so that the placement of an end portion of the opposing electrode in close proximity to the corresponding scanning wire would cause light to leak in a region between the end portion of the opposing electrode and the corresponding scanning wire due to the applied direct current voltage, although such placement reduces regions of edge portions of the signal wire from which light may leak.

Thus, even if the structure of the present invention, having an end portion of an opposing electrode placed over a corresponding scanning wire, were applied to the conventional structure, it would not be possible to completely eliminate light leaking from edge portions of the signal wire. In other words, the present invention can be effective exclusively in the common-less configuration which does not have a common electrode.

Also, in the foregoing structure which involves a plurality of opposing electrodes in contact with a liquid crystal layer through an alignment film, the plurality of opposing electrodes are preferably made of an electro-chemically stable material such as niobium (Nb) or niobium nitride in order to prevent possible failures caused by electro-chemical reactions between a liquid crystal composition and the opposing electrodes.

Since a cell gap is defined by using columnar spacers of a uniform height formed on the TFT substrate, instead of beads previously used for the formation of the cell gap, and sandwiching the spacers between the pair of substrates, the uniformity of the cell gap is improved. Preferably, the columnar spacers are positioned at regular intervals corresponding to periodic placement of pixel electrodes.

Particularly, when the spacers are positioned over the active elements through the opposing electrodes, the columnar spacers can have a minimum height because the spacing between the substrates is the narrowest in regions in which the active elements are formed.

It is therefore possible to reduce the amount of materials required for the columnar spacers and hence a time required to form the columnar spacers.

In addition, since the columnar spacer is arranged over the active element through the opposing electrode, the potential over the active element is maintained at the potential of the opposing electrode and is free from the influence of the columnar spacer, so that the placement of the columnar spacer over the active element will never cause the active element to malfunction.

The opposing electrodes may be made of an electrically conductive oxide such as indium tin oxide or the like which is electrochemically stable. However, since this material is transparent, light shielding is required for the active elements or TFTs. In this event, when columnar spacers having a light shielding property are arranged over the active elements through the opposing electrodes, it is possible to simultaneously achieve a uniform cell gap and light shielded TFTs. Alternatively, a small black matrix may be formed over the TFT for light shielding.

When a TFT is used as the active element, the opposing electrode arranged over the TFT through an insulating layer has a function of a gate electrode (a so-called double gate TFT structure), thus providing an additional effect of an increased mobility and enhanced switching performance for the TFT.

DETAILED DESCRIPTION OF THE EMBODIMENTS

Figure 1:
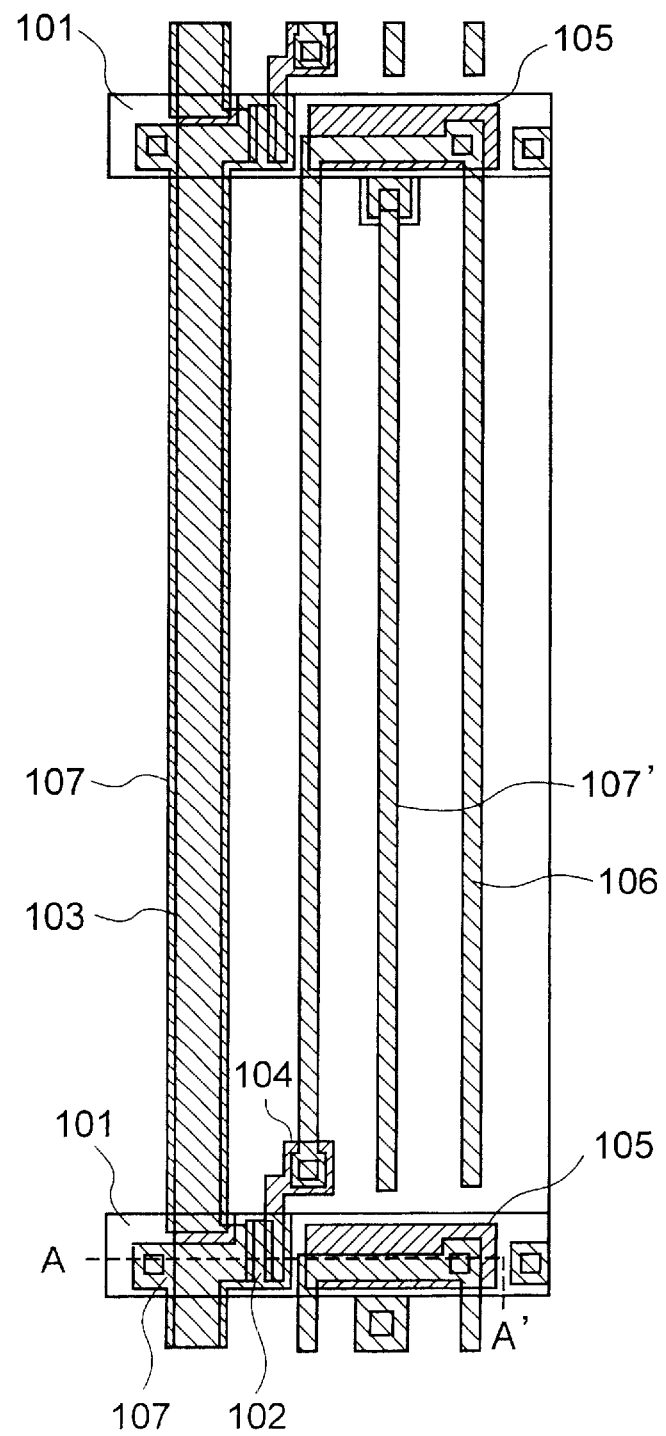
FIG. 1 is a plan view illustrating the structure seen from the top of a pixel section in one embodiment of the present invention.
Figure 2:
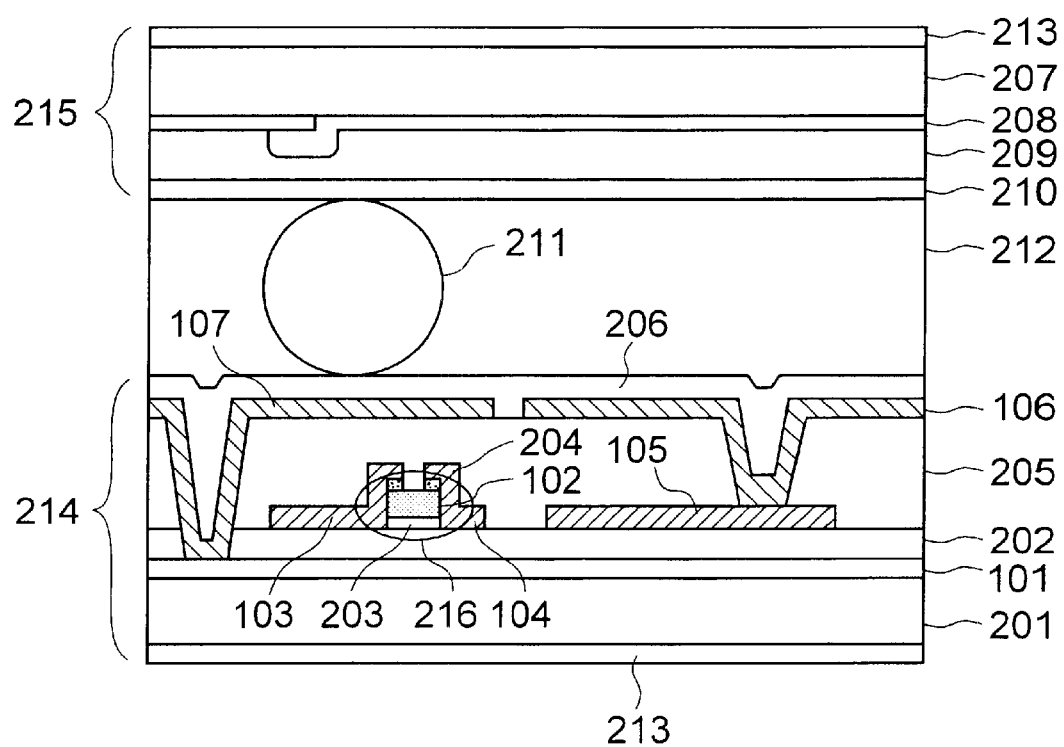
FIG. 2 is a cross-sectional view illustrating the structure in cross-section taken along a line A–A' of the pixel section in FIG. 1.

A first embodiment of the present invention will now be shown with reference to FIGS. 1 and 2.

FIG. 1 illustrates the structure of a pixel section, seen from the top, in the first embodiment. The pixel section includes a scanning wire 101 formed of Cr; a semiconductor layer 102 formed of amorphus silicon; a signal line 103 formed of Cr; a pixel electrode terminal 104 formed of Cr; a storage capacitor terminal 105 formed of Cr; a pixel electrode 106; and opposing electrodes 107, 107'.

FIG. 2 illustrates the structure in cross-section taken along a line A–A' of the pixel section in FIG. 1. The illustrated structure includes a glass substrate 201; a gate insulating layer 202 formed of silicon nitride; an insulating layer 203 formed of silicon oxide; a contact layer 204 formed of $n^+$-type amorphus silicon doped with phosphor; a passivation layer 205 formed of an organic insulating layer; an alignment film 206; a glass substrate 207; a color filter layer 208; a protection layer 209; an alignment film 210; a spacer bead 211; a liquid crystal layer 212; polarizing plates 213; a TFT substrate 214; an opposing substrate 215; and a thin film transistor (TFT) 216.

Description will be next made on how to manufacture the active matrix liquid crystal display device according to the first embodiment illustrated in FIGS. 1 and 2.

First of all, the TFT substrate 214 is manufactured in the following steps. A chromium (Cr) film is first formed by a sputtering method in a thickness of approximately 300 nm on the glass substrate 201 made, for example, of Corning 1737. The Cr film is patterned by photo-etching to form the scanning wire 101. On the glass substrate 201 formed with the scanning wire 101, a silicon nitride layer in a thickness of approximately 250 nm, a silicon oxide layer in a thickness of approximately 50 nm, an amorphus silicon layer in a thickness of approximately 200 nm, and a phosphor-doped $n^+$-type amorphus silicon layer in a thickness of approximately 50 nm are formed in sequence by a plasma chemical vapor deposition (CVD) method. For the formation of the respective layers, the following material gases are used:

$SiH_4+NH_3+N_2$ (for the silicon nitride layer); $SiH_4+N_2O$ (for the silicon oxide layer); $SiH_4+H_2$ (for the amorphus silicon layer); and $SiH_4+H_2+PH_3$ (for the n$^+$-type amorphus silicon layer). Then, the n$^+$-type amorphus silicon layer, the amorphus silicon layer and the silicon oxide layer are insularly processed simultaneously by photo-etching to form the semiconductor layer 102 and the insulating layer 203.

On the structure thus formed, a Cr layer having a thickness of approximately 300 nm is formed using the sputtering method, and is patterned by photo-etching to form the signal wire 103, the pixel electrode terminal 104, and the storage capacitor terminal 105. Further, a portion of the n$^+$-type amorphus silicon layer on the semiconductor layer 102, which is not covered with the signal wire 103 and the pixel electrode terminal 104, is etched to form the contact layer 204 between the signal wire 103 and the pixel electrode terminal 104 and the semiconductor layer 102. Over these layers, a passivation film 205 made of polyimide is formed in a thickness of approximately 1,000 nm by a spin coating method. After forming contact holes through the passivation film 205 and the gate insulating layer 202 by photo-etching, a metal thin film is formed in a thickness of approximately 300 nm by a sputtering method. Subsequently, the metal thin film is patterned by photo-etching to form the pixel electrode 106 and the opposing electrodes 107, 107'.

In this way, the pixel electrode 106 is connected to the pixel electrode terminal 104 and the storage capacitor terminal 105 through the contact hole, while the opposing electrode 107 is connected to the scanning wire 101 also through the contact hole.

Thus, a portion of the gate insulating layer 202 sandwiched between the scanning wire 101 and the storage capacitor terminal 105 defines a storage capacitor. Over the entire structure so far formed, an alignment film 206 is formed by a spin coating method in a thickness of approximately 200 nm. As a consequence of the foregoing steps, the TFT substrate 214 is completed.

Next, the opposing substrate 215 is manufactured by the following steps. First, the color filter 208 is formed by a spin coating method on the glass substrate 207 made of Corning 1737 in a thickness of approximately 500 nm. Then, the protection film 209 in a thickness of approximately 500 nm and an alignment film 210 in a thickness of 200 nm are formed by a spin coating over the color filter 208.

The TFT substrate 214 and the opposing substrate 215, after the surfaces of their alignment films 206, 210 have been aligned, are opposed so as to sandwich therebetween beads 211 made of silicon oxide and having a diameter of approximately 4 μm. Then, a liquid crystal composition is encapsulated in a resulting cell gap formed between the substrates to form a liquid crystal layer 212. Finally, the polarizing plate 213 is attached on each of the outer surfaces of the TFT substrate 214 and the opposing substrate 215, thus completing a liquid crystal panel.

In this embodiment, the opposing electrode 107 is arranged over the signal wire 103 and the TFT 216 through the insulating passivation film 205, such that the opposing electrode 107 overlaps the signal wire 103 and the TFT 216. The opposing electrode 107 has an end portion positioned on the corresponding scanning wire 101. Also, a region occupied by the signal wire 103 is included in a region occupied by the opposing electrode 107 and the scanning wire 101. Therefore, the foregoing structure prevents light from leaking from edge portions of the signal wire 103.

Also, this liquid crystal display device is structured without common wire, as described in JP-A-8-62578, wherein the opposing electrode 107 is connected to the scanning wire 101 through the contact hole formed continuously through the passivation film 205 and the gate insulating layer 202. Thus, the scanning wire 101 does not require the shielding because no light leaks from edge portions thereof.

It is therefore appreciated that the liquid crystal display device of this embodiment does not require the BM which would otherwise be arranged on the opposing substrate. As a result, the aperture ratio is improved by approximately 20% more than before, and ends up to be approximately 60%. Also, in the foregoing structure, the passivation film 205 is formed in an increased thickness to improve the planarity of the TFT substrate 214, while the elimination of the BM from the opposing substrate 215 also contributes to an improved planarity of the opposing substrate 215. Consequently, the amount of beads required to maintain a predetermined cell gap can be reduced to one or less per pixel (conventionally, approximately three beads have been required per pixel), leading to an improved contrast. Moreover, with this structure, since the pixel electrode 106 and the opposing electrodes 107, 107', used to apply voltages to the liquid crystal, are formed on the passivation film 205, the voltages for driving the liquid crystal will not be increased even if the passivation film 205 is increased in thickness.

It is desirable in this structure that the pixel electrode 106 and the opposing electrodes 107, 107' be formed of an electro-chemically stable material since they are in contact with the liquid crystal layer 212 through the alignment layer 206. A life test conducted for the liquid crystal panel revealed that when niobium (Nb) or niobium nitride was used, the pixel electrode 106 and the opposing electrodes 107, 107' were not corroded.

In this embodiment, since the TFT has a so-called double gate TFT structure, its mobility is improved by approximately 10% as compared with conventional TFT structures. In addition, the TFT structure in this embodiment may use an MNOS structure as described in the specification and the accompanying drawings of PCT application JP96-3467, wherein the insulating layer 203 formed of silicon oxide is interposed between the gate insulating layer 202 made of silicon nitride and the semiconductor layer 102, so that the TFT structure provides an enhancement-type TFT characteristic which is required to drive a common wire eliminated configuration.

Figure 3:
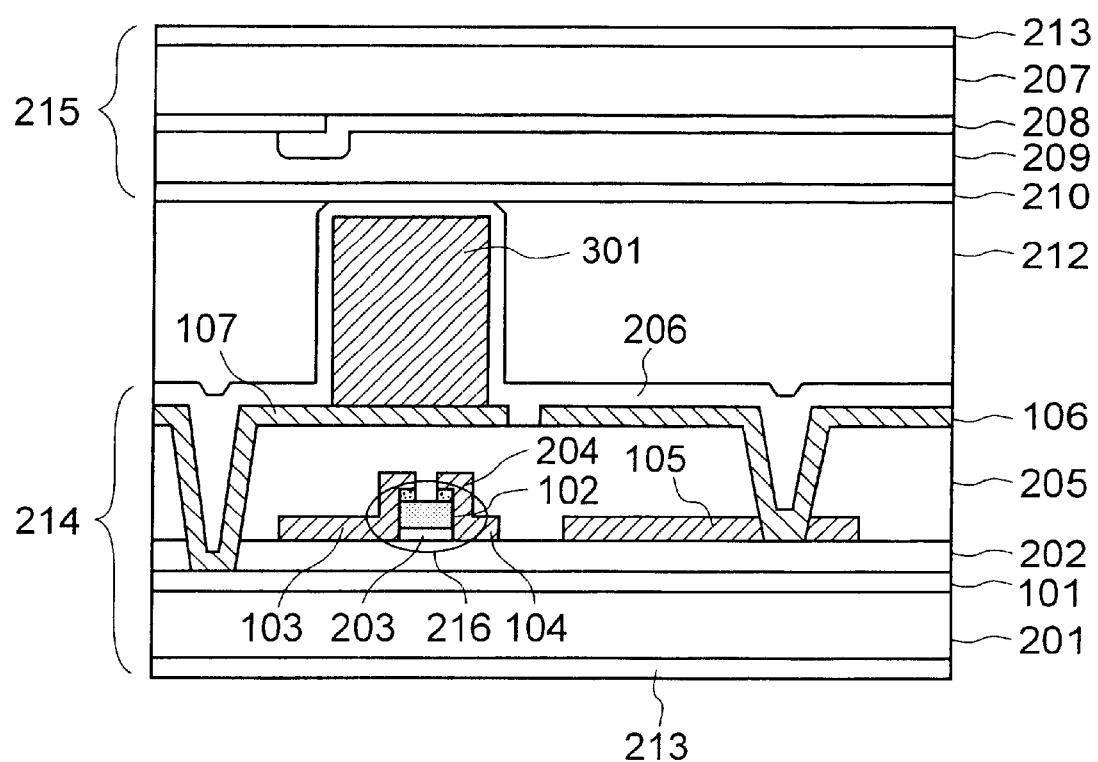
FIG. 3 is a cross-sectional view illustrating the structure in cross-section of a pixel section in another embodiment of the present invention.
Figure 4:
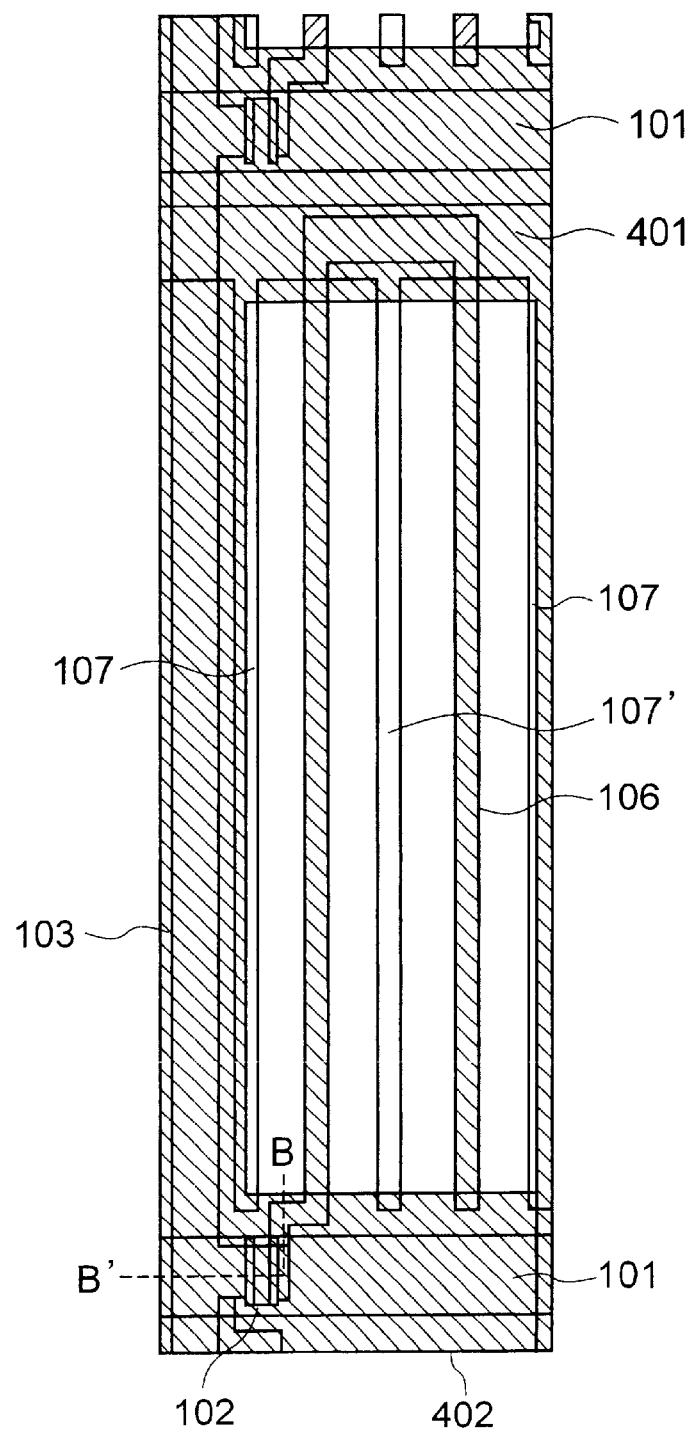
FIG. 4 is a plan view illustrating the structure seen from the top of a pixel section in a conventional liquid crystal display device.
Figure 5:
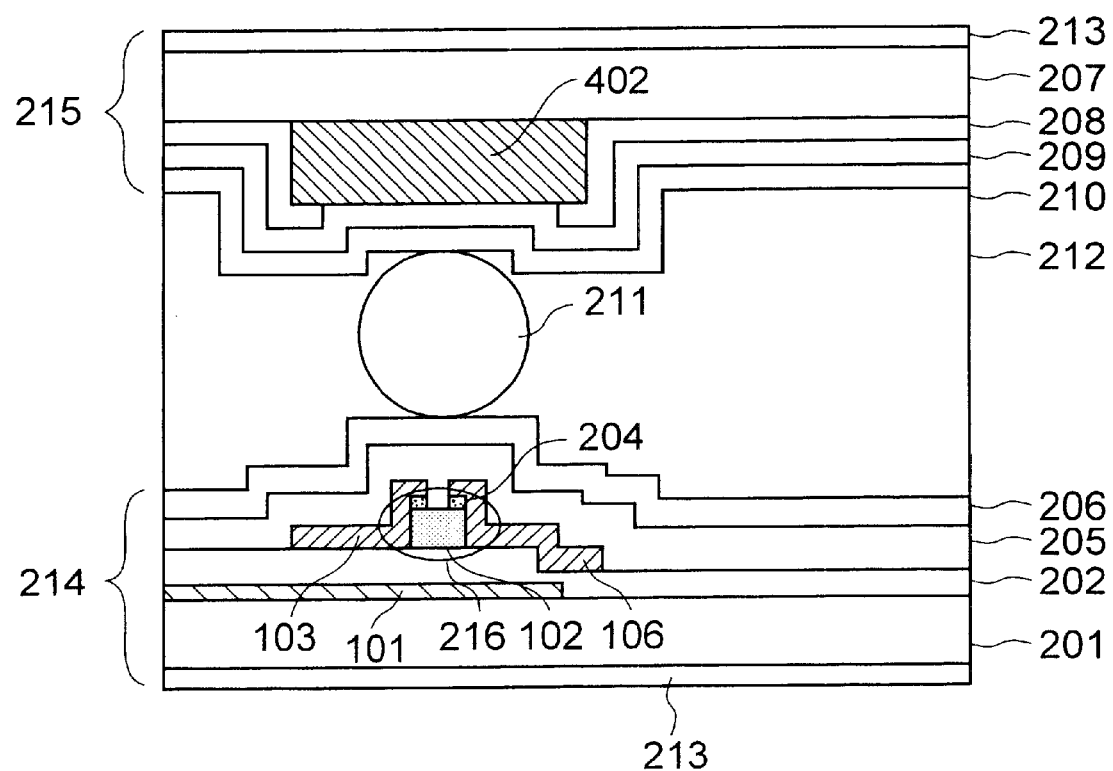
FIG. 5 is a cross-sectional view illustrating the structure in cross-section taken along a line B–B' of the pixel section in FIG. 4.

Next, a second embodiment of the present invention will be shown with reference to FIG. 3.

FIG. 3 illustrates in cross-sectional view the structure of a pixel section in the second embodiment. The second embodiment has such a structure that a cell gap is formed by sandwiching a columnar spacer 301 formed on a TFT substrate 214 between the TFT substrate 214 and an opposing substrate 215, instead of the bead 211 of the first embodiment. The columnar spacer 301 is formed by forming a silicon oxide film of 4 μm in thickness, for example, by an SOG (Spin on Glass) method, and patterning the silicon oxide film by photo-etching.

When the columnar spacer 301 is arranged over a TFT 216 through an opposing electrode 107 and a passivation film 205, the columnar spacer 301 can be reduced in size (height), thereby reducing a time required to form the columnar spacer 301. Actually, this reduction is realized because the spacing between the substrates is the narrowest in this region, so that the columnar spacer only needs to have a minimum height required to ensure a predetermined cell gap. In addition, since the opposing electrode 107 interposed between the columnar spacer 301 and the TFT 216 maintains the potential over the TFT 216 equal to the potential of the opposing electrode 107, the TFT 216 is free from malfunctioning caused by a disturbed electric field due to an electrical characteristic of the columnar spacer.

Next, a third embodiment of the present invention will be shown referring again to FIG. 3.

A material for use in constituting the opposing electrode 107 may be an electrically conductive oxide such as indium tin oxide or the like which is electro-chemically stable. In this case, since the resulting opposing electrode 107 is transparent, a light shielding means is required for the TFT 216. The light shielding means may be realized by providing a small BM opposite to the TFT 216.

Alternatively, a columnar spacer 301 made of a material having a light shielding property such as a resin BM material may be arranged above the TFT 216 to achieve the light shielding for the TFT 216 as well as the formation of a uniform cell gap.

Figure 6:
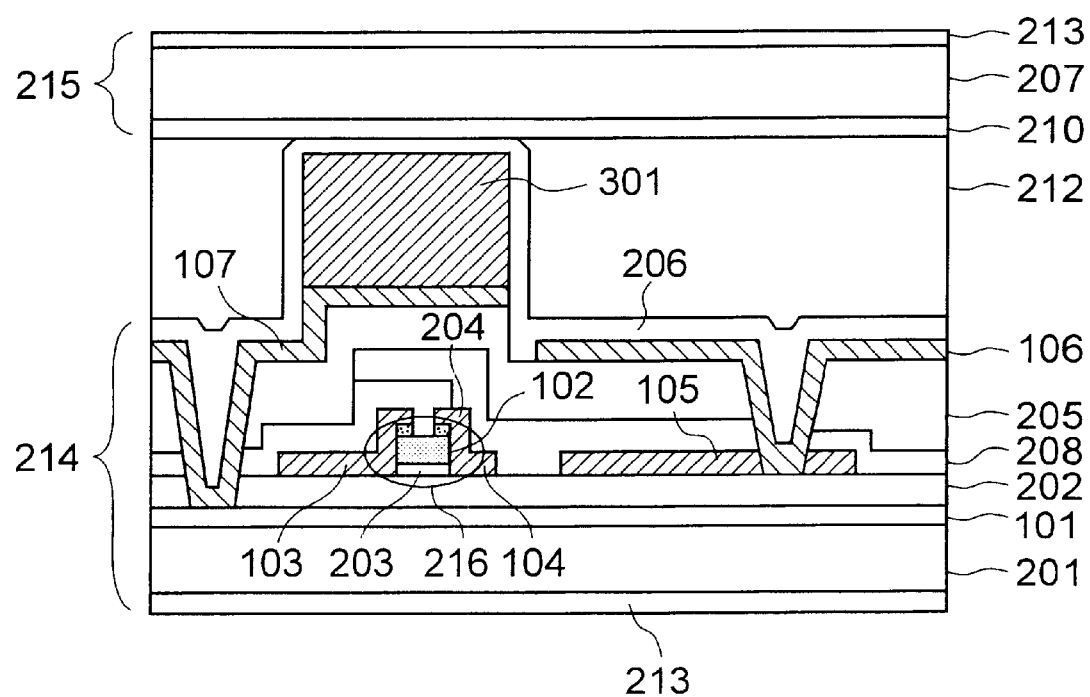
FIG. 6 is a cross-sectional view illustrating the structure in cross-section of a pixel section in another embodiment of the present invention.
Figure 7:
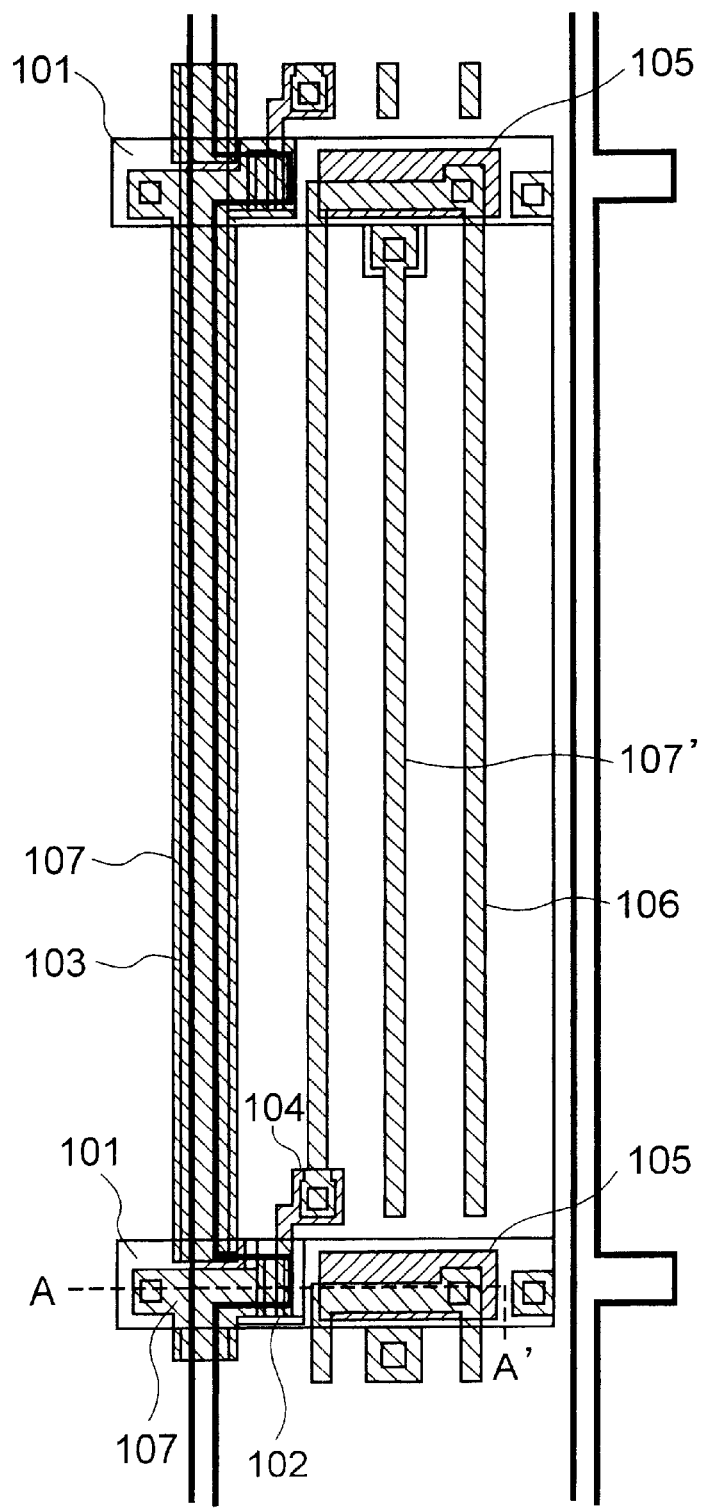
FIG. 7 is a plan view illustrating the structure seen from the top of the pixel section in the embodiment of FIG. 6.

Next, a fourth embodiment of the present invention will be shown with reference to FIGS. 6 and 7.

FIG. 6 illustrates in cross-sectional view the structure of a pixel section in the fourth embodiment. The fourth embodiment is characterized by a color filter layer 208 which is arranged on the TFT substrate side, more specifically, below a passivation film 205. With the structure as illustrated, since the passivation film 205 serves as the aforementioned protection film 209 for the color layer 208, the protection film 209 can be omitted, thus producing an effect of reducing a cost resulting from a reduction in the number of members.

FIG. 7 illustrates the structure of the pixel section in the fourth embodiment viewed from the top. In this figure, borders of each RGB color region of the color filter layer 208 are indicated by bold lines. As illustrated in FIGS. 6 and 7, one end portion of each RGB color region of the color filter layer 208 is arranged on a TFT. When a columnar spacer 301 is arranged over the TFT 216 through an opposing electrode 107, the passivation layer 205 and the color filter layer 208, the columnar spacer 301 can be further reduced in size (height), resulting in a reduced time in forming the columnar spacer 301. This is because the height of the columnar spacer required to ensure a predetermined cell gap is further reduced since the spacing between the TFT substrate and the opposing substrate becomes narrower in this region due to adjacent two color regions of the color filter layer 208 overlapping on the TFT. It should be noted that this effect can also be produced in the embodiment illustrated in FIG. 3 which has the color filter layer 208 on the opposing substrate.

Figure 8:
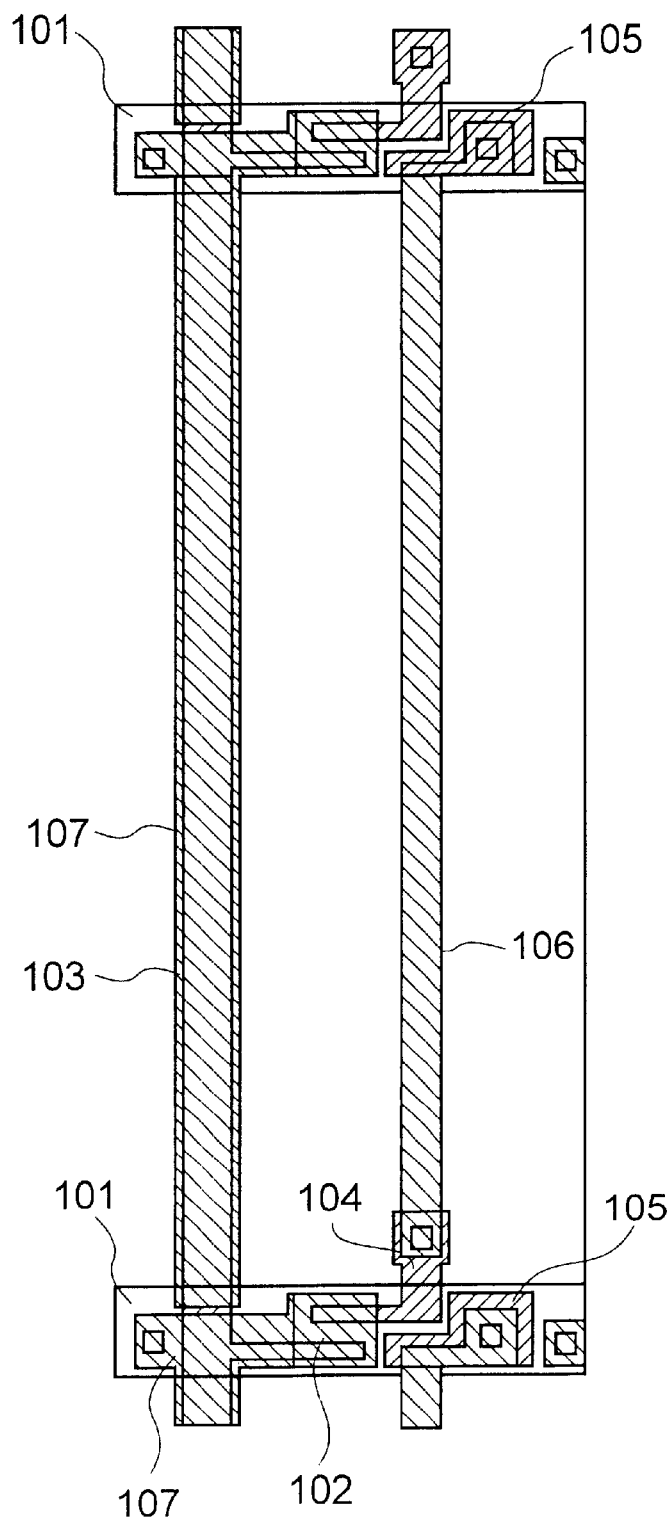
FIG. 8 is a plan view illustrating the structure seen from the top of an embodiment according to the present invention.

Next, a fifth embodiment of the present invention will be shown with reference to FIG. 8.

FIG. 8 illustrates the structure of a pixel section in the fifth embodiment viewed from the top. In this structure, a pixel is bisected by a pixel electrode 106 and two opposing electrodes 107, thus defining a so-called bisect pixel structure. Such a pixel structure is typically employed in a high definition IPS-type liquid crystal display device which has a definition (the number of pixels per unit length) of approximately 150 dpi (dot per inch) or higher. Thus, a high definition IPS-type liquid crystal display device has a pixel size approximately one-half of that of the quadrisect pixel structure illustrated in FIG. 1.

As appreciated, the proportion of an area shielded by wires and a BM to the area of one pixel is larger in the bisect pixel structure than in the quadrisect pixel structure. Thus, a particularly large effect in improving the aperture ratio can be produced by employing a pixel structure in which the common wire and the BM are omitted, and the opposing electrode 107 overlaps a signal wire 103 and a semiconductor layer 102. In such a small pixel, the contrast is degraded in a higher proportion due to light leaking near beads. To eliminate this inconvenience, the columnar spacer of the second embodiment may be employed, with the result that the contrast is significantly improved.

According to the foregoing, since the present invention can eliminate or reduce the size of the BM which would otherwise be arranged on the opposing substrate, the aperture ratio is improved, and the substrates are planarized. As a result, the improved aperture ratio contributes to a reduction in power consumption. In addition, an improved contrast is provided by virtue of a higher uniformity of the cell gap resulting from the planarized substrates in combination of a reduced number of beads required to define a predetermined cell gap.

In alternative embodiments, since the cell gap is formed by columnar spacers arranged on the TFT substrate instead of beads which may cause leakage of light, the uniformity of the cell gap and the contrast can be improved at the same time.

As will be appreciated from the foregoing, the present invention provides an active matrix liquid crystal display device which improves the aperture ratio and the uniformity of the cell gap, exhibits a highly uniform display luminance with lower power consumption, and provides high contrast images.

What is claimed is:

1. An active matrix liquid crystal display device comprising:
   a pair of substrates, at least one of said substrates being transparent;
   a liquid crystal layer sandwiched between said pair of substrates; and
   a plurality of scanning wires, a plurality of signal wires formed in a matrix with said scanning wires, a plurality of active elements formed corresponding to respective intersections of said plurality of signal wires with said plurality of scanning wires, a plurality of pixel electrodes connected to said active elements, and a plurality of opposing electrodes connected to said plurality of scanning wires and formed to produce electric fields predominantly parallel with said pair of substrates between said plurality of pixel electrodes and said opposing electrodes, all of said wires, said active elements and said electrodes being formed on one of said pair of substrates,
   wherein portions of said plurality of opposing electrodes are formed over said plurality of signal wires through an insulating film, and regions having said plurality of signal wires formed therein, viewed from a direction perpendicular to the surfaces of said substrates, are included in regions having said plurality of opposing electrodes formed therein and regions having said plurality of scanning wires formed therein.

2. An active matrix liquid crystal display device according to claim 1, wherein said portions of said opposing electrodes are each formed to overlap a scanning wire adjacent to a scanning wire to which a corresponding pixel electrode is connected.

3. An active matrix liquid crystal display device according to claim 1, wherein said plurality of opposing electrodes are made of niobium or niobium nitride.

4. An active matrix liquid crystal display device according to claim 1, wherein a black matrix is omitted.

5. An active matrix liquid crystal display device according to claim 1, further comprising columnar spacers formed on said substrate which has said scanning wires, said signal wires and said active elements, said columnar spacers being sandwiched between said pair of substrates to ensure a uniform thickness of said liquid crystal layer.

6. An active matrix liquid crystal display device according to claim 5, wherein each of said columnar spacers is arranged at a position over an active element through said opposing electrode.

7. An active matrix liquid crystal display device according to claim 6, wherein said columnar spacers are formed of a light shielding material.

8. An active matrix liquid crystal display device according to claim 1, wherein said plurality of opposing electrodes are made of an electrically conductive oxide including indium tin oxide, and said active matrix liquid crystal display device further comprises columnar spacers having a light shielding property over said active elements through said opposing electrodes, said columnar spacers being sandwiched between said pair of substrates to ensure a uniform thickness of said liquid crystal layer.

9. An active matrix liquid crystal display device comprising:
   a pair of substrates, at least one of said substrates being transparent;
   a liquid crystal layer sandwiched between said pair of substrates; and
   a plurality of scanning wires, a plurality of signal wires formed in a matrix with said scanning wires, a plurality of active elements formed corresponding to respective intersections of said plurality of signal wires with said plurality of scanning wires, a plurality of pixel electrodes connected to said active elements, and a plurality of opposing electrodes connected to said plurality of scanning wires, all of said wires, said active elements and said electrodes being formed on one of said pair of substrates,
   wherein said liquid crystal is driven by applying voltages between said plurality of pixel electrodes and said plurality of opposing electrodes; and
   portions of said plurality of opposing electrodes are formed over said plurality of signal wires through an insulating film, and regions having said plurality of signal wires formed therein, viewed from a direction perpendicular to the surfaces of said substrates, are included in regions having said plurality of opposing electrodes formed therein and regions having said plurality of scanning wires formed therein.

10. An active matrix liquid crystal display device according to claim 9, further comprising columnar spacers formed on said substrate which has said scanning wires, said signal wires and said active elements, said columnar spacers being sandwiched between said pair of substrates to ensure a uniform thickness of said liquid crystal layer.

11. An active matrix liquid crystal display device according to claim 10, wherein each of said columnar spacers is arranged at a position over an active element through said opposing electrode.

12. An active matrix liquid crystal display device according to claim 11, wherein said columnar spacers are formed of a light shielding material.

13. An active matrix liquid crystal display device according to claim 9, wherein said plurality of opposing electrodes are made of an electrically conductive oxide including indium tin oxide, and said active matrix liquid crystal display device further comprises columnar spacers having a light shielding property over said active elements through said opposing electrodes, said columnar spacers being sandwiched between said pair of substrates to ensure a uniform thickness of said liquid crystal layer.

* * * * *